US010358094B2

(12) United States Patent
Dornik et al.

(10) Patent No.: US 10,358,094 B2
(45) Date of Patent: Jul. 23, 2019

(54) ABBREVIATED VISOR ASSEMBLY

(71) Applicant: FORD GLOBAL TECHNOLOGIES, LLC, Dearborn, MI (US)

(72) Inventors: Nicholas Dornik, Canton, MI (US); Anthony Ligi, Jr., Chelsea, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/819,631

(22) Filed: Nov. 21, 2017

(65) Prior Publication Data

US 2019/0152402 A1 May 23, 2019

(51) Int. Cl.
*B60R 7/05* (2006.01)
*B60R 11/02* (2006.01)
*B60J 3/02* (2006.01)
*B60R 11/00* (2006.01)

(52) U.S. Cl.
CPC .......... *B60R 7/05* (2013.01); *B60J 3/0208* (2013.01); *B60J 3/0278* (2013.01); *B60R 11/02* (2013.01); *B60R 2011/0035* (2013.01); *B60R 2011/0075* (2013.01); *B60R 2011/0082* (2013.01); *B60R 2011/0085* (2013.01)

(58) Field of Classification Search
CPC .......... B60R 7/05; B60J 3/0208; B60J 3/0278
USPC ........................................... 296/97.5
See application file for complete search history.

(56) References Cited

U.S. PATENT DOCUMENTS

| 4,421,355 | A | * | 12/1983 | Marcus | B60J 3/0282 296/97.5 |
| 4,947,296 | A | * | 8/1990 | Takeuchi | B60J 3/0282 296/97.5 |
| 7,413,233 | B1 | | 8/2008 | Jung | |
| 9,487,150 | B2 | | 11/2016 | Cha | |
| 2008/0217950 | A1 | * | 9/2008 | Tiesler | B60J 3/0204 296/97.5 |

FOREIGN PATENT DOCUMENTS

| CN | 201205900 Y | 3/2009 |
| JP | 05028718 U | 4/1993 |
| JP | 2004155316 A | 6/2004 |
| KR | 101761851 B1 | 7/2017 |

OTHER PUBLICATIONS

English Machine Translation of CN201205900Y.
English Machine Translation of JP05028718U.
English Machine Translation of JP2004155316A.
English Machine Translation of KR101761851B1.

* cited by examiner

*Primary Examiner* — Joseph D. Pape
(74) *Attorney, Agent, or Firm* — Vichit Chea; King & Schickli, PLLC

(57) ABSTRACT

A visor assembly includes a visor body, an electronic device receiver and a pivot feature connecting the electronic device receiver to the visor body. The visor assembly also includes a light shield that extends between the electronic device receiver and the visor body and functions to block light passing through the gap between the visor body and the electronic device receiver when the visor body and electronic device receiver are in certain configurations.

17 Claims, 8 Drawing Sheets

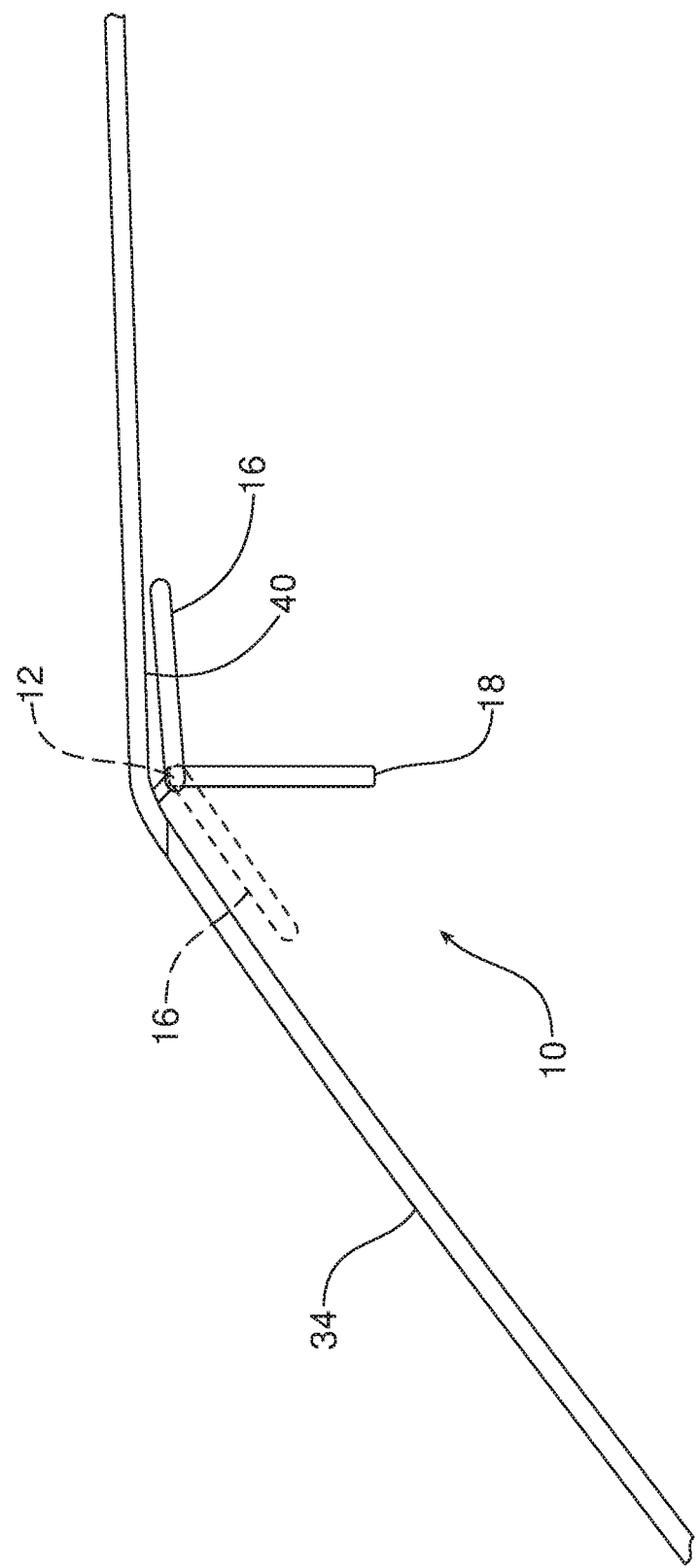

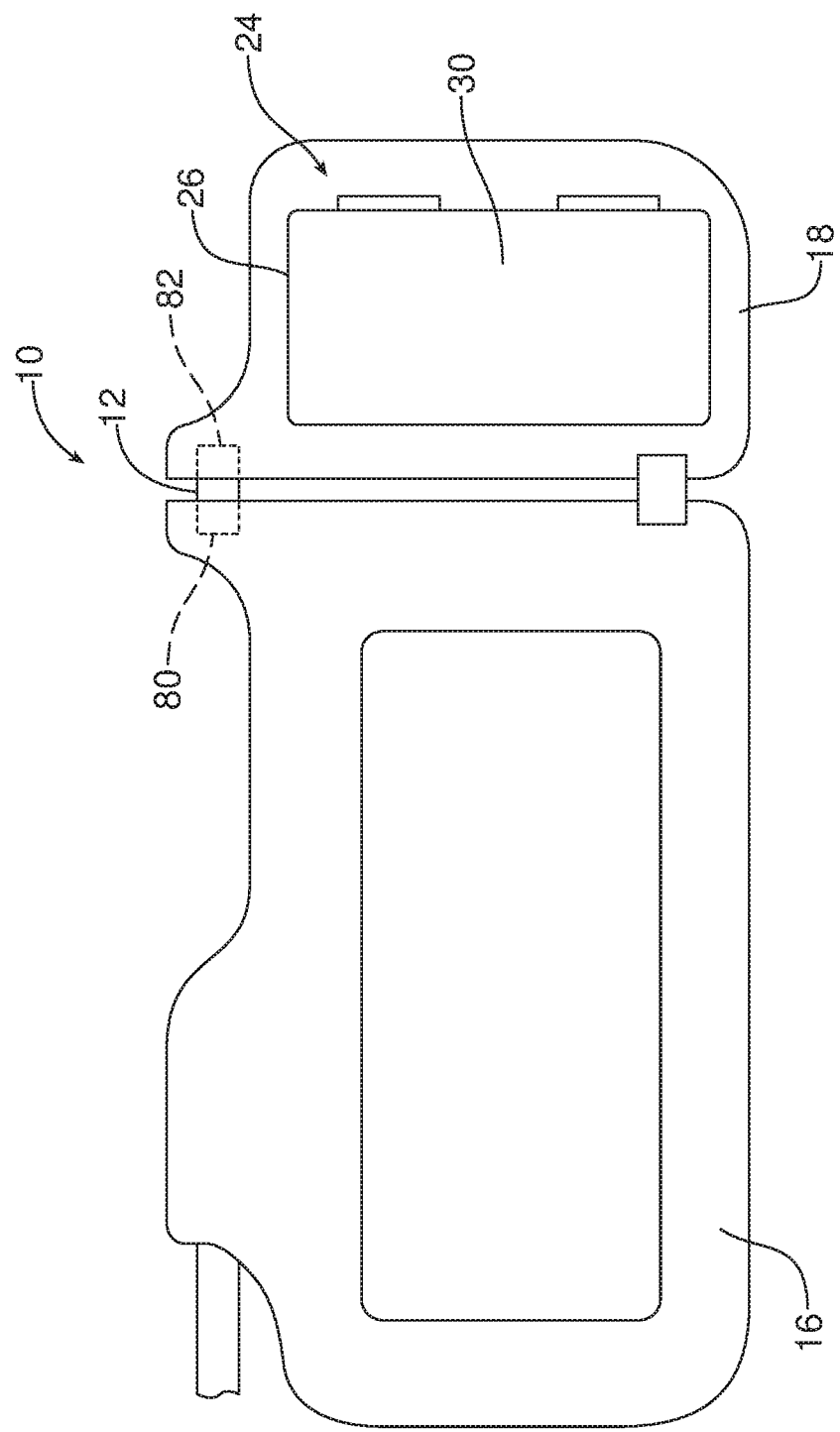

ABBREVIATED VISOR ASSEMBLY

TECHNICAL FIELD

This document relates generally to the motor vehicle equipment field and, more particularly, to a new and improved visor assembly adapted to hold an electronic device as desired by the operator.

BACKGROUND

The existing industry standard of a single sun visor panel significantly limits the use of visor-mounted accessories including, for example, electronic devices such as cameras, navigation devices, cell phones and the like. More specifically, when the accessory is fixed to the sun visor panel and the single sun visor panel is reoriented to block the sun, the accessory is also reoriented in a manner that could well cause the accessory to lose key functionality. For example, a sun visor mounted camera mounted to and properly oriented on the visor panel when the visor panel is in the stowed position would no longer be in the correct orientation to view the roadway when the sun visor panel is deployed to block incoming sunlight or glare.

This document relates to a new and improved visor assembly incorporating a visor body having two sections: a primary or first section that is oriented as necessary to block sunlight or glare and a secondary or second section including an electronic device receiver. The position of the second section is independently adjustable with respect to the first section thereby allowing any electronic device in the electronic device receiver to be oriented as desired by the operator for optimum performance irrespective of the position of the first section of the visor body.

SUMMARY

In accordance with the purposes and benefits described herein, a new and improved visor assembly is provided. That visor assembly comprises a visor body, an electronic device receiver, a pivot feature connecting the electronic device receiver to the visor body and a light shield. The light shield extends between the electronic device receiver and the visor body.

More specifically, the light shield may be displaceable between a collapsed configuration and an extended configuration. In one possible embodiment, the light shield comprises an accordion wall that extends around the electronic device receiver from a first point adjacent a first end of the pivot feature to a second point adjacent a second end of the pivot feature. The visor body may include an inner margin defining an opening. The pivot feature may include a pivot rod extending across that opening.

The electronic device receiver may be received over the pivot rod and may be displaceable from a first position in the opening within the inner margin and a second position projecting from the opening and the inner margin. The light shield may be connected to the inner margin so as to close the gap between the visor body and the electronic device receiver when the two are positioned at different angular orientations such as when the electronic device receiver is in the second position projecting from the opening and the inner margin.

The electronic device receiver comprises a secondary panel including a cavity to receive and hold an electronic device. That cavity may include a bottom wall and a sidewall. The bottom wall may include a camera port.

Further, the electronic device receiver may further include a detent for holding the electronic device within the cavity. That detent may be provided on the sidewall of the cavity.

In an alternative embodiment the light shield comprises a wall made from a stretch material instead of an accordion wall as described above.

In the following description, there are shown and described several preferred embodiments of the visor assembly. As it should be realized, the visor assembly is capable of other, different embodiments and its several details are capable of modification in various, obvious aspects all without departing from the visor assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the visor assembly and together with the description serve to explain certain principles thereof.

FIG. 2 is a schematic illustration of the visor assembly illustrated in FIG. 1 showing how the second section of the visor body that holds an electronic device may be adjusted independently of the first section of the visor body so that the device may be placed in an ideal operating position.

FIG. 4 illustrates an alternative embodiment of the visor assembly illustrated in FIG. 1.

FIG. 5a illustrates the light shield in a collapsed configuration while FIG. 5b illustrates the light shield in an extended configuration.

Reference will now be made in detail to the present preferred embodiments of the visor assembly, examples of which are illustrated in the accompanying drawing figures.

DETAILED DESCRIPTION

Figure 1:
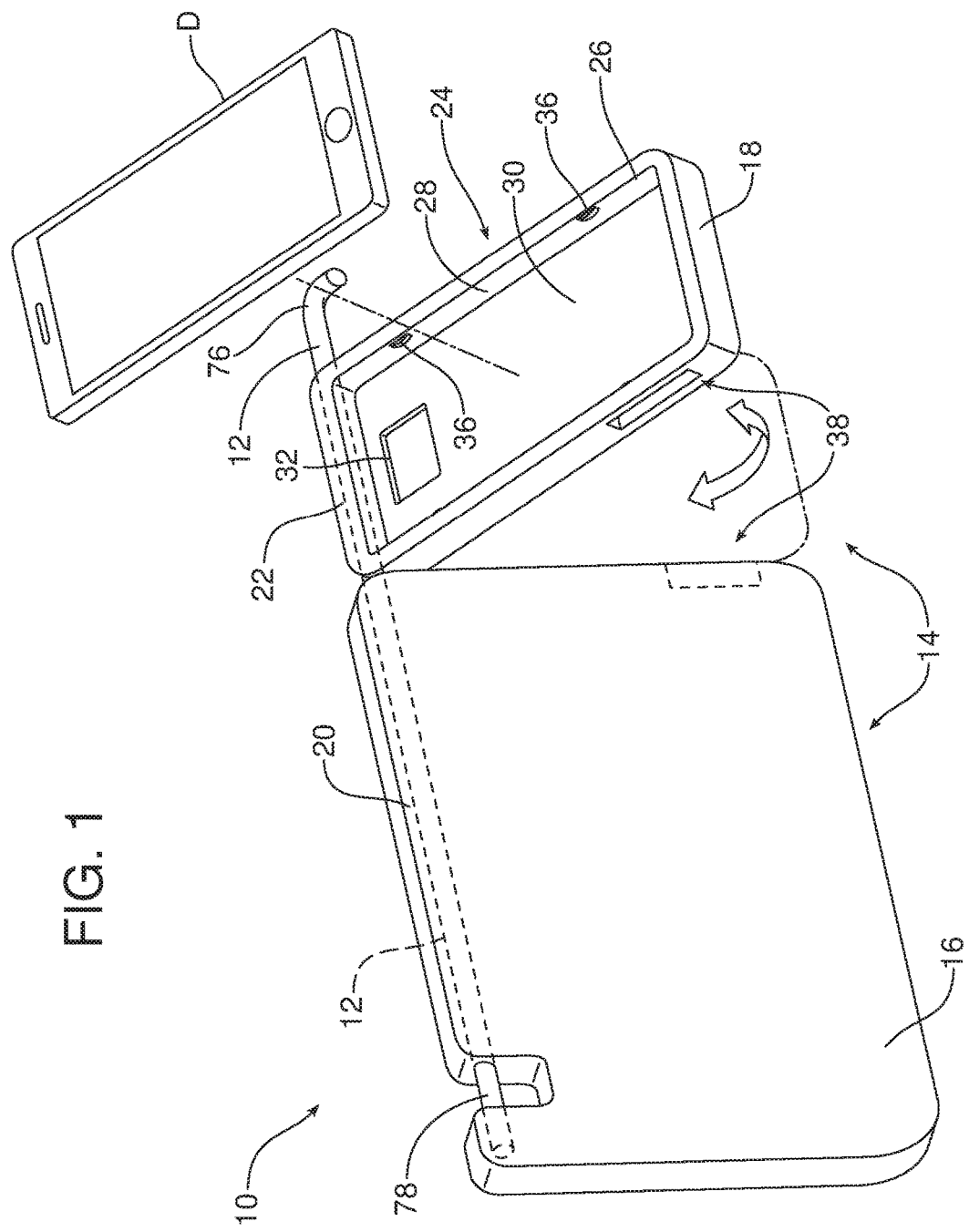
FIG. 1 is a detailed perspective of a first embodiment of the visor assembly wherein the visor body includes two side-by-side sections that may be independently, angularly adjusted on a single support.

Reference is now made to FIG. 1 illustrating a first embodiment of the new and improved visor assembly 10. The visor assembly 10 includes a support 12 in the form of a continuous rod. In addition, the visor assembly 10 includes a visor body 14 having a first section 16 and a second section 18.

The first section 16 has a first pivot connection 20 with the support 12. The second section 18 has a second pivot connection 22 with the support 12. An electronic device receiver, generally designated by reference numeral 24 is carried on the second section 18.

More specifically, the electronic device receiver 24 of the illustrated embodiment comprises a cavity 26 that is sized and shaped to hold an electronic device D. More specifically, the cavity 26 includes a sidewall 28 and a bottom wall 30. A camera port 32 is provided in the bottom wall 30. Thus, when the second section 18 of the visor body 14 is deployed as illustrated in FIG. 2, the camera port 32 is facing forward allowing the electronic device to function as a dash camera and capture forward facing video through the windshield 34.

As further illustrated in FIG. 1, the electronic device receiver 24 also includes a feature for securing the electronic device D in the cavity 26. In the illustrated embodiment that feature 36 comprises at least one resilient detent. Two resilient detents 36 are illustrated in FIG. 1. It should be appreciated that the number, size and shape of the resilient detents 36 may be modified as desired in order to secure an electronic device D in the cavity 26 of the electronic device receiver 24 and hold that device in place when subjected to foreseeable acceleration, deceleration and cornering forces anticipated during operation of the motor vehicle.

As illustrated in FIG. 1, the visor assembly 10 also includes a releasable latch, generally designated by reference numeral 38 for interconnecting the first section 16 with the second section 18. When the releasable latch 38 is latched, the first section 16 and second section 18 move in concert as a single visor body and, therefore, may be pivoted together on the support 12. In contrast, when the releasable latch 38 is released, the first section 16 and second section 18 pivot independently about the support 12. Thus, as illustrated in FIG. 2, when the releasable latch 38 is released, the first section 16 of the visor body 14 may be maintained in a home position against the headliner 40 while the second section 18 may be pivoted downward to hold the electronic device D in an operating position suitable to function as a dash camera for taking photographs or video through the windshield 34.

As should be further appreciated from viewing FIG. 2, the first section 16 may be independently pivoted into a fully deployed position along the windshield 34 as illustrated in phantom line to block sunlight or glare while the second section 18 remains in the indicated position for optimal operation of the electronic device. Thus, for example, where the electronic device D is a camera, it is maintained in proper orientation to allow the capturing of images through the forward-facing camera port 32 and windshield 34. Where the electronic device D is an electronic navigation device, the view screen is maintained in proper rearward orientation for viewing by the motor vehicle operator.

It should be appreciated that the releasable latch 38 may assume a number of different forms or configurations. Four possible configurations for the releasable latch 38 are illustrated in FIGS. 3a-3d.

Figure 3A:
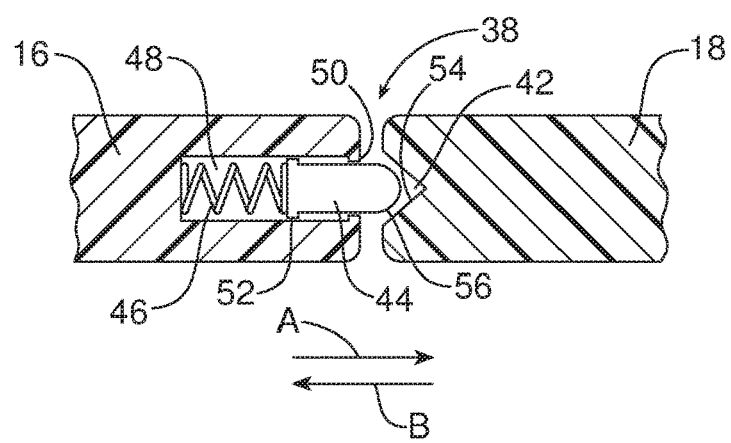
FIGS. 3a-3d illustrate four different types of releasable latches that may be utilized to secure the first and second sections of the visor body together so that they may be pivoted in concert with one another or released to allow independent pivoting of the first and second sections on the support.

As illustrated in FIG. 3a, the releasable latch 38 comprises a detent receiver 42, a detent 44 and a biasing element 46 for biasing the detent into engagement with the detent receiver. More specifically, as illustrated, the detent receiver 42 is provided in the second section 18 of the visor body 14 while the detent 44 and the biasing element 46 are held in the cavity 48 in the first section 16 of the visor body. A shoulder 50 at the open end of the cavity 48 engages a stop 52 on the end of the detent 44 to prevent the biasing element 46 from forcing the detent 44 out of the cavity 48.

When the first section 16 and second section 18 of the visor body are aligned as illustrated in FIG. 3a, the biasing element 46 biases the detent 44 into the detent receiver 42 (note action arrow A) securing the first and second sections of the visor body together. When secured in this manner, the first and second sections 16, 18 of the visor body 14 move in concert together. When one wishes to move the first section 16 and the second section 18 independent of one another, one may hold one of the sections 16, 18 stationary while pivoting the other section. Under these conditions, the wall 54 of the detent receiver 42 engages the rounded end 56 of the detent 44 that acts as a cam causing the detent 44 to be moved in the direction of action arrow B against the force of the biasing element 46 until the detent is completely free of the detent receiver 42 and independent movement of the two sections is established.

Figure 3B:
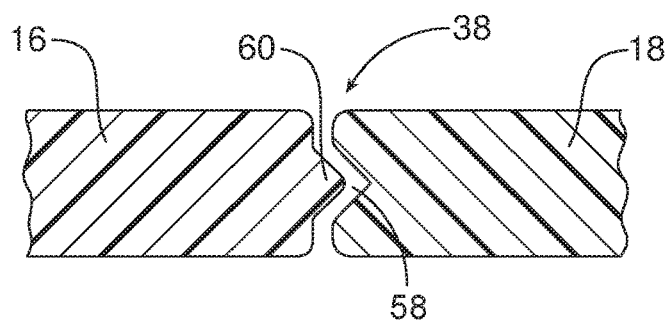

FIG. 3b illustrates an alternative embodiment of the releasable latch. In FIG. 3b, the releasable latch comprises a detent receiver 58 carried on the second section 18 of the visor body 14 and a fixed detent 60 carried on the first section 16 of the visor body.

Figure 3C:
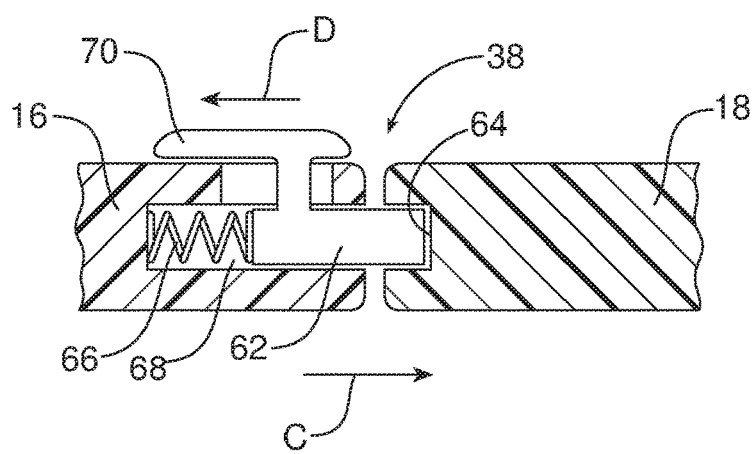

FIG. 3c illustrates yet another possible embodiment of the releasable latch 38, including a latch 62, a latch receiver 64 and a biasing element 66 for biasing the latch toward engagement with the latch receiver (note action arrow C). As illustrated, the latch receiver 64 is carried on the second section 18 of the visor body 14 while the latch 62 and biasing element 66 are carried in a cavity 68 on the first section 16 of the visor body.

An actuator 70 is carried on the latch 62. When one wishes to release the latch 62 from the latch receiver 64 to establish independent movement of the first and second sections 16, 18 of the visor body 14, one engages the actuator 70 and presses the actuator in the direction of action arrow D against the biasing force of the biasing element 66 until the latch 62 is displaced from the latch receiver 64 to allow the two sections 16, 18 to be moved independent of one another.

Figure 3D:
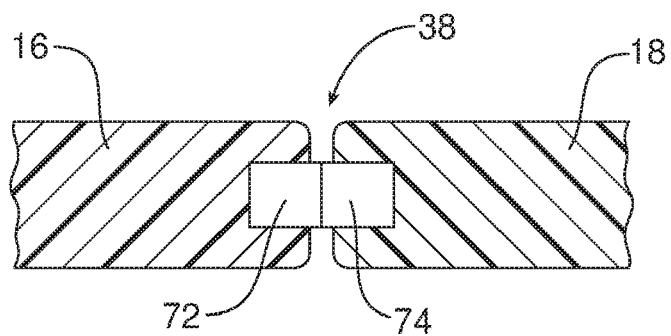

In yet another embodiment illustrated in FIG. 3d, the releasable latch 38 includes a first magnetic element 72 carried on the first section 16 of the visor body 14 and a second, cooperating magnetic element 74 carried on the second section 18 of the visor body. When the first section 16 is aligned with the second section 18, the first magnetic element 72 is attracted to the second magnetic element 74 with sufficient force to tend the hold two sections together so that the two sections may be moved as a single visor body 14. In contrast, when one wishes to move the first section 16 and the second section 18 independent of one another, one holds one section 16 or 18 in position while pivoting the other section with sufficient force to overcome the attraction force between the first magnet 72 and the second magnet 74. This releases the releasable latch 38 and then allows for independent positioning of the first and second sections 16, 18 of the visor body 14.

It should be appreciated that FIGS. 3a-3d illustrate four possible embodiments of the releasable latch 38. The releasable latch 38 may comprise other possible embodiments and, therefore, FIGS. 3a-3d should be considered as illustrative in nature and not restrictive.

Reference is now made to FIG. 4 illustrating an alternative embodiment of the visor assembly 10. For purposes of brevity of description, the structural components of the visor assembly 10 illustrated in FIG. 4 corresponding with the structural components of the visor assembly 10 illustrated in FIG. 1 are illustrated by the same reference numbers. In the FIG. 1 embodiment, the support 12 of the visor assembly 10 extends continuously from the elbow 76 that is connected to the hinge point of the visor assembly 10 to the distal end 78 that may be secured to a clip at the headliner in a manner known in the art. In contrast, in the embodiment illustrated in FIG. 4, the support 12 is truncated and neither includes an elbow nor a clip section. Thus, in the FIG. 4 embodiment the support 12 has a first distal end 80 pivotally secured in the first section 16 of the visor body 14 and a second distal end 82 pivotally secured in the second section 18 of the visor body.

Figure 5A:
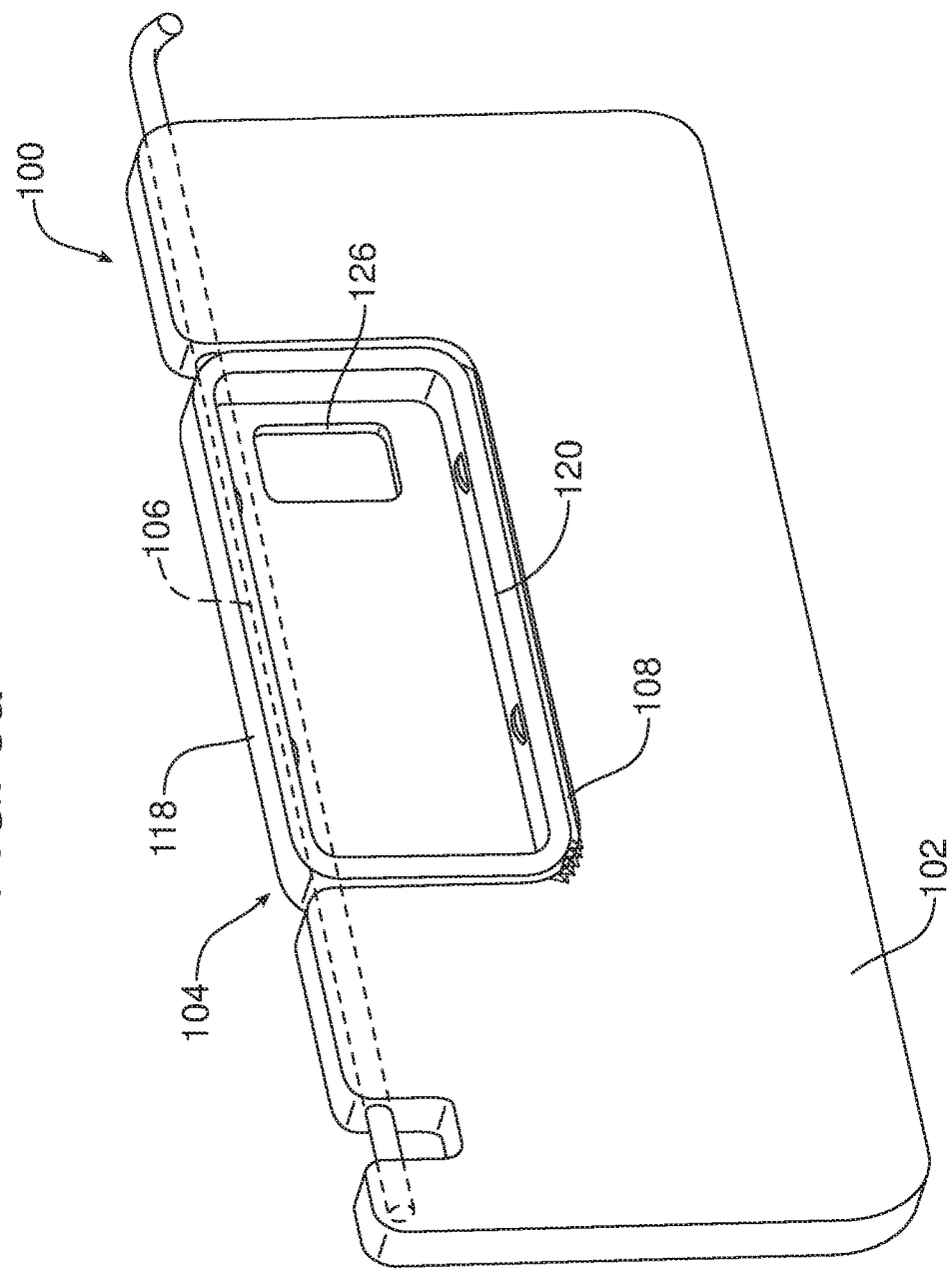
FIGS. 5a and 5b are detailed perspective views of yet another possible embodiment of the visor assembly that incorporates a light shield.
Figure 5B:
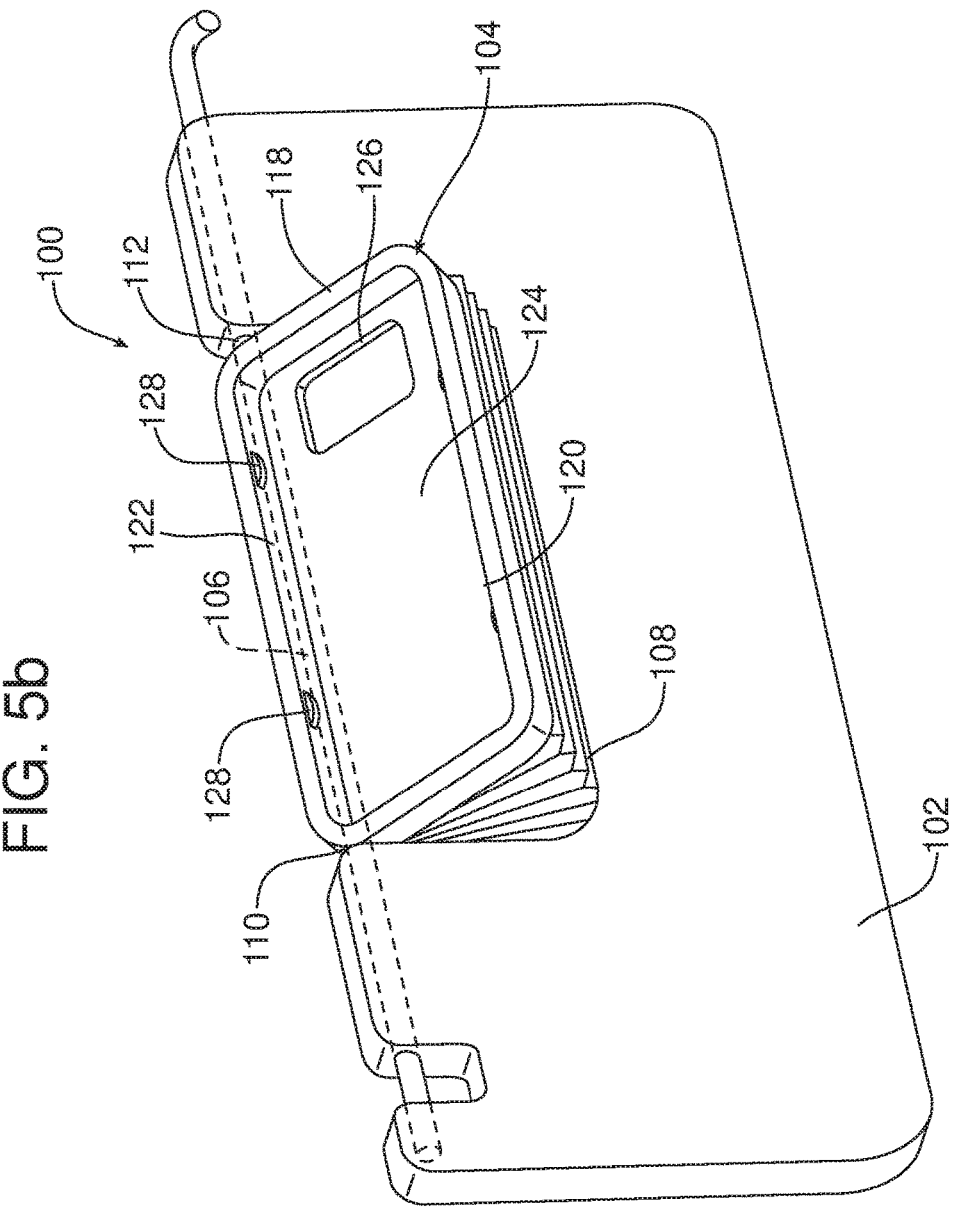

Reference is now made to FIGS. 5a and 5b illustrating yet another possible embodiment of a visor assembly 100. The visor assembly 100 includes a visor body 102, an electronic device receiver 104, a pivot feature 106 connecting the electronic device receiver to the visor body and a light shield 108 extending between the electronic device receiver and the visor body.

As best illustrated in FIGS. 5a and 5b, the light shield 108 is displaceable between a collapsed configuration shown in FIG. 5a and an extended configuration shown in FIG. 5b.

Figure 6:
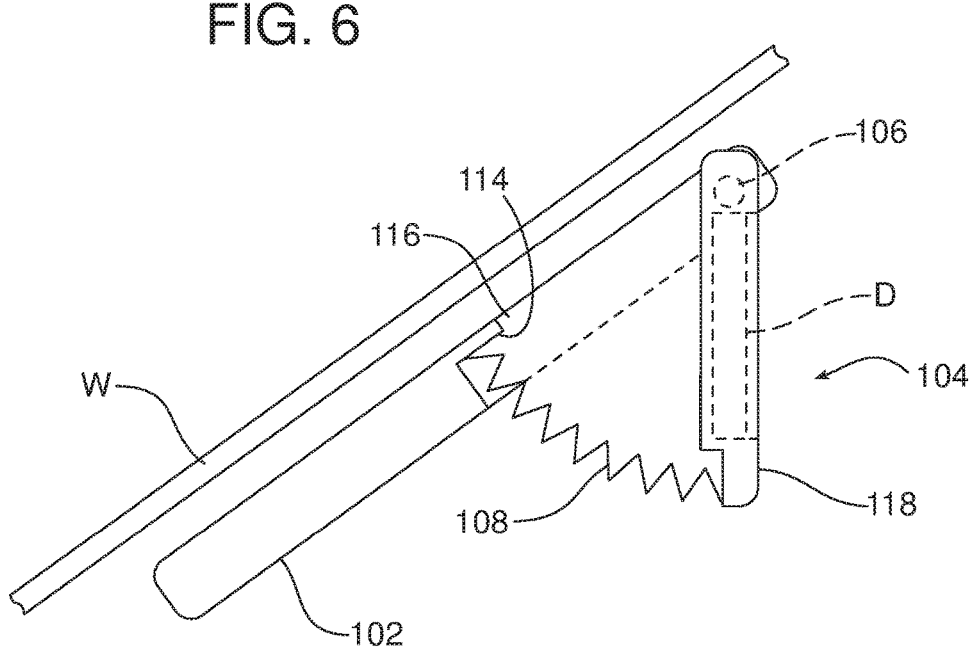
FIG. 6 is a schematic side elevational view of the visor assembly embodiment illustrated in FIGS. 5a and 5b showing the light shield in the extended configuration.

In the embodiment illustrated in FIGS. 5a, 5b and 6, the light shield 108 comprises an accordion wall that extends around the electronic device receiver 104 from a first point 110 which is at a first end of the pivot feature 106 to a second point 112 adjacent a second end of the pivot feature.

More specifically, the visor body 102 includes an inner margin 114 defining an opening 116. The pivot feature 106 in the illustrated embodiment comprises a pivot rod extending across that opening 116.

The electronic device receiver 104 is received over the pivot rod/pivot feature 106 and is displaceable from a first position in the opening 116 within the inner margin 114 illustrated in FIG. 5a and a second position projecting from the opening and the inner margin as illustrated in FIGS. 5b and 6. As should be appreciated, one end of the light shield 108 is connected to the electronic device receiver 104 while the other end of the light shield is connected to the inner margin 114 of the visor body 102. When the visor body 102 is positioned across the windshield W to block sunlight and glare while the electronic device receiver 104 is maintained in a substantially vertical orientation for optimum operation when the electronic device is a camera, it should be appreciated that the light shield 108 closes the gap between the visor body 102 and the electronic device receiver 104 preventing sunlight from passing through and potentially distracting or blinding the motor vehicle operator.

The electronic device receiver 104 of this embodiment of the visor assembly 100 is similar to the electronic device receiver 24 of the embodiment illustrated in FIG. 1. More specifically, the electronic device receiver 104 comprises a secondary panel 118 including a cavity 120 to receive and hold an electronic device D. The cavity 120 is sized and shaped to hold an electronic device D and includes a sidewall 122 and a bottom wall 124. The bottom wall 124 includes a camera port 126. Further, the electronic device receiver 104 includes a feature for securing the electronic device D in the cavity 120. That feature may comprise at least one resilient detent 128 carried on the sidewall 122.

Figure 7:
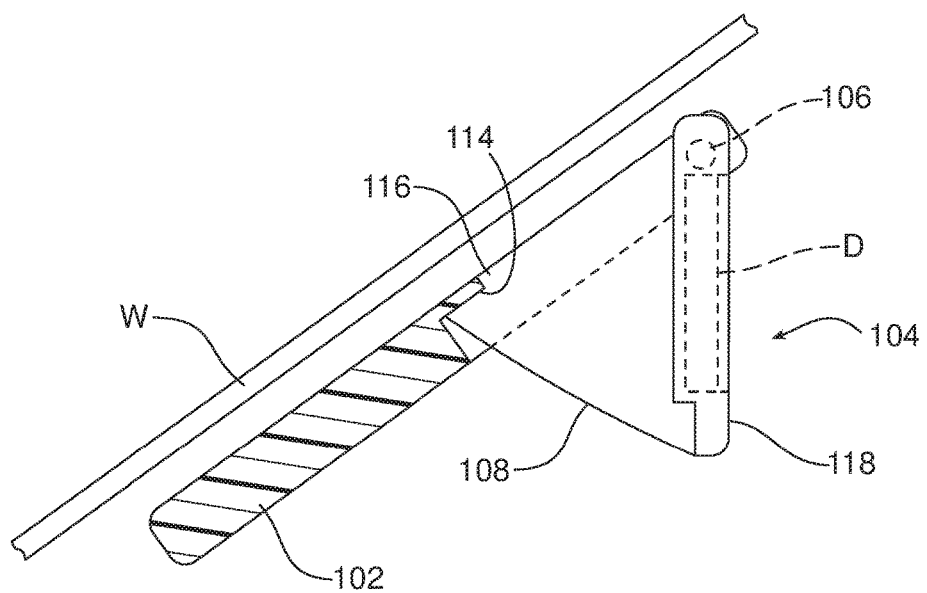
FIG. 7 is a schematic side elevational view of yet another possible embodiment of the visor assembly wherein the light shield is made with a stretch fabric.

Reference is now made to FIG. 7 illustrating an alternative embodiment of the visor assembly 100 wherein the light shield 108 is made from a stretch material such as spandex instead of the accordion wall structure as illustrated in the embodiment shown in FIGS. 5a, 5b and 6.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A visor assembly, comprising:
a visor body;
an electronic device receiver;
a pivot feature connecting said electronic device receiver to said visor body; and
a light shield extending between said electronic device receiver and said visor body wherein said light shield is an accordion wall.

2. The visor assembly of claim 1, wherein said light shield is displaceable between a collapsed configuration and an extended configuration.

3. The visor assembly of claim 1, wherein said accordion wall extends around said electronic device receiver from a first point adjacent a first end of said pivot feature to a second point adjacent a second end of said pivot feature.

4. The visor assembly of claim 1, wherein said visor body includes an inner margin defining an opening.

5. The visor assembly of claim 1, wherein said pivot feature includes a pivot rod extending across said opening.

6. The visor assembly of claim 1, wherein said electronic device receiver is received over said pivot rod and is displaceable from a first portion in said opening within said inner margin and a second position projecting from said opening and said inner margin.

7. The visor assembly of claim 1, wherein said light shield is connected to said inner margin.

8. The visor assembly of claim 1, wherein said electronic device receiver includes a cavity to receive and hold an electronic device.

9. The visor assembly of claim 1, wherein said electronic device receiver includes a detent holding said electronic device within said cavity.

10. A visor assembly, comprising:
a visor body;
an electronic device receiver;
a pivot feature connecting said electronic device receiver to said visor body; and
a light shield extending between said electronic device receiver and said visor body wherein said light shield is a wall made from a stretch material.

11. The visor assembly of claim 10, wherein said wall extends around said electronic device receiver from a first point adjacent a first end of said pivot feature to a second point adjacent a second end of said pivot feature.

12. The visor assembly of claim 11, wherein said visor body includes an inner margin defining an opening.

13. The visor assembly of claim 12, wherein said pivot feature includes a pivot rod extending across said opening.

14. The visor assembly of claim 13, wherein said electronic device receiver is received over said pivot rod and is displaceable from a first position in said opening within said inner margin and a second position projecting from said opening and said inner margin.

15. The visor assembly of claim 14, wherein said light shield is connected to said inner margin.

16. The visor assembly of claim 15, wherein said electronic device receiver includes a cavity to receive and hold an electronic device.

17. The visor assembly of claim 16, wherein said electronic device receiver includes a detent holding said electronic device within said cavity.

* * * * *